United States Patent [19]

Ozawa et al.

[11] Patent Number: 5,164,239

[45] Date of Patent: Nov. 17, 1992

[54] MAGNETIC DISC ASSEMBLY COMPRISING A DISC HAVING A MAGNETIC LAYER WITH A SPECIFIED COMPOSITION AND A CASE HAVING A SPECIFIED LINER

[75] Inventors: Kimio Ozawa; Hisato Kato; Hiroaki Yamagishi; Kazumasa Matsumoto, all of Hino, Japan

[73] Assignee: Konica Corporation, Tokyo, Japan

[21] Appl. No.: 614,006

[22] Filed: Nov. 13, 1990

[30] Foreign Application Priority Data

| Nov. 16, 1989 | [JP] | Japan | 1-298177 |
| Nov. 16, 1989 | [JP] | Japan | 1-298178 |
| Nov. 16, 1989 | [JP] | Japan | 1-298179 |
| Feb. 9, 1990 | [JP] | Japan | 2-30522 |

[51] Int. Cl.$^5$ .............................. G11B 5/00
[52] U.S. Cl. ...................... 428/64; 428/694; 428/900; 428/425.9; 428/65; 360/133; 206/444; 252/62.54
[58] Field of Search ............... 360/133; 428/694, 900, 428/425.9, 424.6, 64, 65; 206/444; 252/62.54

[56] References Cited

U.S. PATENT DOCUMENTS

| 4,085,907 | 4/1978 | Suzuki et al. | 242/199 |
| 4,154,886 | 5/1979 | Yamazaki et al. | 428/200 |
| 4,784,914 | 11/1988 | Matsufuji et al. | 428/418 |
| 4,786,557 | 11/1988 | Kakuishi et al. | 428/418 |
| 4,812,938 | 3/1989 | Rogers et al. | 360/133 |
| 4,845,583 | 7/1989 | Zimmerman et al. | 360/133 |
| 4,998,176 | 3/1991 | Takemae et al. | 360/133 |
| 5,051,287 | 9/1991 | Yamada et al. | 428/64 |

*Primary Examiner*—Paul J. Thiodbeau
*Assistant Examiner*—Stevan A. Resan
*Attorney, Agent, or Firm*—Jordan B. Bierman

[57] ABSTRACT

A magnetic disc is disclosed, which comprises a disc-shaped magnetic recording medium having a magnetic layer comprising a ferromagnetic powder and a binder and a case having a liner of a nonwoven fabric comprising a polyester fiber or a polyacrylonitrile fiber in a ratio of not less than 30% by weight. The binder of the magnetic recording medium comprises a modified polyurethane resin containing a a polar group selected from the group consisting of a $-SO_3M$ group, a $-OSO_3M$ group, a $-COOM$ group, a $-PO(OM)_2$ group and a $-OPO(OM)_2$ group, in which M is a hydrogen atom or a alkali metal atom, or a hydroxyl group provided that the polar group may form an intramolecular salt.

49 Claims, 2 Drawing Sheets

MAGNETIC DISC ASSEMBLY COMPRISING A DISC HAVING A MAGNETIC LAYER WITH A SPECIFIED COMPOSITION AND A CASE HAVING A SPECIFIED LINER

FIELD OF THE INVENTION

The present invention relates to a magnetic disc.

BACKGROUND OF THE INVENTION

An information recording device is essential to any information processing system. In the field of information recording with such systems, magnetic recording is the main stream, since it is now supported by fair technical advance which has so far been made, it is less expensive than other recording methods, and it offers nonvolatile recording.

In recent years, there have been increasing demands for higher density and higher capacity for magnetic recording media. To meet these demands, it is necessary to obtain:

(1) excellent surface smoothness for reduced spacing loss; and
(2) excellent dispersibility and high packing density of magnetic powder for increased output.

Meanwhile, there will be increasing demands for improved durability and reliability with the increase in the capacity of recording media. For these improvements, some special features including the following are needed.

(1) The magnetic layer should have excellent abrasion resistance.
(2) The magnetic layer surface is not contaminated with stain, dust or other contaminants.

Such magnetic recording uses a floppy disc, for instance, which comprises a disc-shaped magnetic recording medium, having a magnetic layer containing a magnetic powder and a binder, and a medium cleaning liner, in contact with the magnetic layer described above, both housed in a casing. The liner described above generally comprises a nonwoven fabric, e.g., rayon braided member tied with thermoplastic polypropylene, and its periphery is joined to the inside of the casing by hot melt adhesion or ultrasonic melt adhesion.

However, conventional nonwoven fabrics made mainly of rayon show considerable detachment of resin powder and fluff, though their cleanability is relatively good. If a non-rayon component for the prevention of this phenomenon, e.g., polyester fiber or polypropylene is increased, the cleanability is degraded or the magnetic layer is damaged, and drop-out increases.

Also, despite the increasing demands for higher density, higher output and higher durability of floppy discs, there have been no known binders which are sufficiently dispersible in fine grains of magnetic powder, and it has been difficult to obtain high density and high durability.

SUMMARY OF THE INVENTION

The object of the present invention is to provide a magnetic disc which satisfies the requirements for excellent reliability for a long time, high durability, high density and high output under any set of environmental conditions.

The object of the invention has been accomplished with a magnetic disc comprising a disc-shaped magnetic recording medium having a magnetic layer comprising a ferromagnetic powder and a binder comprising a modified polyurethane resine containing a polar group selected from the group consisting of a $-SO_3M$ group, a $-OSO_3M$ group, a $-COOM$ group, a $-PO(OM)_2$ group, a $-OPO(OM)_2$ group and a hydroxyl group, in which M is a hydrogen atom or a alkali metal atom, provided that the $-SO_3M$ group, $-OSO_3M$ group, $-COOM$ group, $-PO(OM)_2$ group and $-OPO(OM)_2$ group containing the modified polyurethane resin are each allowed to form an intramolecular salt, and a case having a liner of a nonwoven fabric comprising a polyester fibre and/or a polyacrylonitrile fiber in a ratio of not less than 30% of total fibre weight contained in said liner.

BRIEF DESCRIPTION OF THE DRAWINGS

The accompanying drawings illustrate the present invention, in which.

DETAILED DESCRIPTION OF THE INVENTION

In magnetic discs for high density recording, signals are recorded at high track density or high lane density. Therefore, the area per bit signal on magnetic recording medium is extremely small. This noticeably increases the ratio of occurrence of errors at recording and reading of signals due to contamination of the magnetic recording medium with stain, dust and other contaminants.

Thus, the liner to remove the contaminants on the magnetic recording medium is required to be high in contaminant removing effect and to produce little dust per se. The afore-mentioned liner containing more than 30% of polyester or polyacrylonitrile fiber satisfies these requirements, but it is faulty that it is likely to damage the surface of the magnetic recording medium.

The present invention provides a magnetic disc capable of high density recording wherein damage by a liner containing more than 30% polyester or polyacrylonitrile is prevented by using a specific binder in the magnetic recording member.

Figure 1:
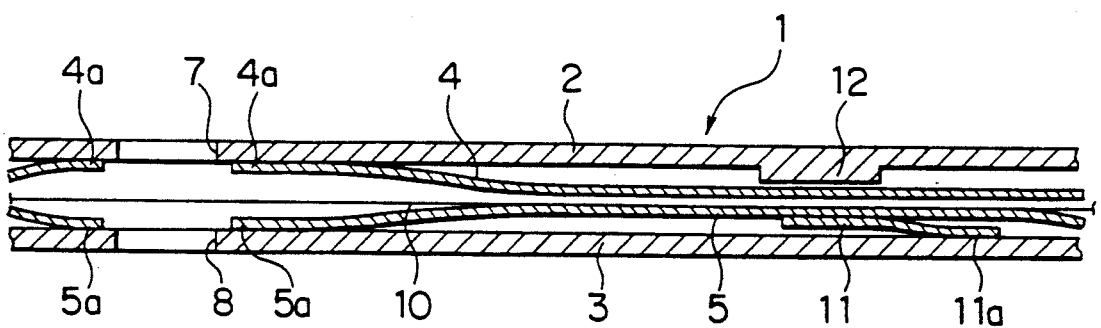
FIG. 1 is a partial magnified cross sectional view (cross section cut along the I—I line in FIG. 3) of a magnetic disc medium housed in a casing with the upper and lower halves joined to each other.
Figure 3:
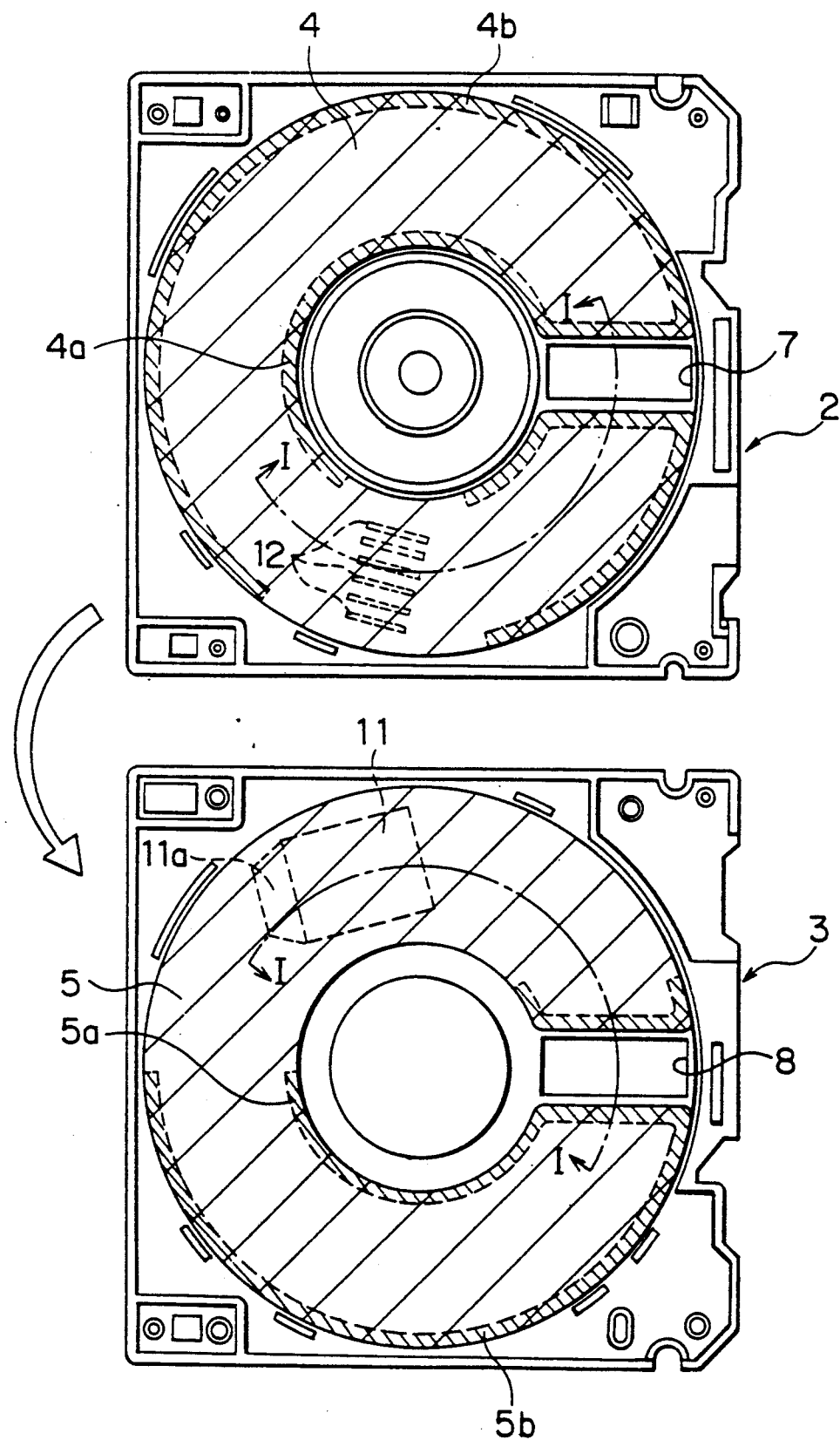
FIG. 3 is a plain of each inside face with both the halves separated from each other.

FIGS. 1 and 3 illustrate a 3.5-inch floppy disc 1 according to a mode of embodiment of the present invention.

FIG. 3 shows the inner surface of each of upper half 2 and lower half 3, composing the casing (shell) of the disc 1, with the two halves separated from each other. Each half has openings 7 and 8, and is configured so that the housed disc medium 10 faces these openings 7 and 8. The openings 7 and 8 are usually shielded by a metal shutter (not illustrated) worked to have a ]-shaped cross section so that the disc medium 10 is not exposed when the disc is not used. When the disc is being driven or during magnetic recording, the shutter is shifted to the opening position and the recording surface of the disc medium 10 is exposed to the opened openings 7 and 8. The disc medium 10 is housed in the housing halves 2 and 3 while it is allowed to rotate therein and fixed in a center hub (not illustrated) attached to the spindle on the drive side. The nearly C-shaped liners 4 and 5 (indicated by shaded zones in FIG. 3) for disc medium cleaning, attached to the inner face of each half, are joined and fixed to the inner face of each half by hot melt adhesion or ultrasonic melt adhesion at peripheral portions 4a, 4b and 5a, 5b. As shown in FIG. 1, the disc medium 10 is rotated when it is applied to the disc drive, and the liner 5, disc medium 10 and liner 4 are pressed against the rib 12 on the upper half side at the lifter position by a lifter 11 fixed to the lower half 3 by 11a, where sliding, i.e., cleaning, is performed between disc and liner.

Figure 2:
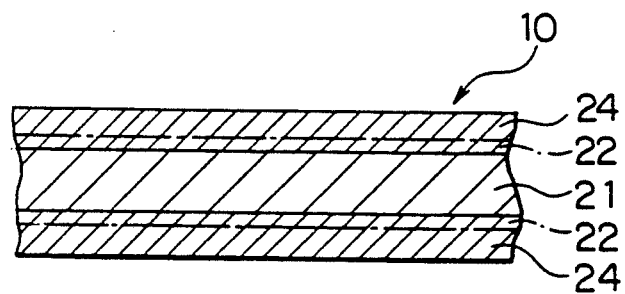
FIG. 2 is a cross sectional view of a magnetic disc medium.

For example, the disc medium 10 comprises a magnetic layer 24 formed on both faces of a nonmagnetic support 21, via a subbed layer 22 if necessary, as shown in FIG. 2. An overcoat layer (not illustrated) may be formed on the magnetic layer as necessary.

In the floppy disc described above, a nonwoven fabric containing more than 30% by weight of polyester fiber and/or polyacrylonitrile fiber, if both fibers are contained, the total content is over 30% by weight, is used as liners 4 and 5. In this nonwoven fabric, the afore-mentioned polyester and polyacrylonitrile fibers are both capable of singly forming a braided member of nonwoven fabric to show satisfactory cleaning performance as well as capable of tying the braided member of rayon, which forms the nonwoven fabric, to act to prevent their detachment. Therefore, it is necessary that the fiber content should exceed 30% by weight of the total amount of the nonwoven fabric, with preference given to a content of not less than 50% by weight.

Examples of such liners are given below in which E represents polyester; A represents polyacrylonitrile; R represents rayon; numerical figures are ratios by weight.

(a) Polyester fiber containing liner
  149-007, produced by Kendall Co. (E=100)
  149-188, produced by Kendall Co. (E50/R50)
  TK450D, produced by Mitsubishi Rayon Co. (E50/R50)
  #1002, produced by H/V Co. (E50/R50)
  SP-286, produced by Kendall Co. (E70/R30, 3-layer liner)
(b) Polyacrylonitrile containing liner
  VA-250, produced by Mitsubishi Rayon Co. (A=100)
  VK-450, produced by Mitsubishi Rayon Co. (A50/R50)

Liner components other than polyester and polyacrylonitrile include not only rayon but also nylon and so forth.

The liner may contain a lubricant, an antistatic agent, and so forth.

Also, the liner may have a double or triple layer structure as disclosed in Japanese Patent Publication Open to Public Inspection Nos. 184977/1988 and 157876/1988. In this case, it is preferable that the liner layer in contact with disc medium contain at least 30% by weight of polyester and/or polyacrylonitrile.

The liner thickness is preferably 100 to 500 μm, more preferably 150 to 300 μm.

On the other hand, the magnetic layer 24, constituting the afore-mentioned disc medium 10, comprises a magnetic powder dispersed in a binder.

Examples of magnetic powders include ferromagnetic powders such as magnetic powders of oxides, e.g., γ-Fe$_2$O$_3$, Co-containing γ-Fe$_2$O$_3$, Co-adhered γ-Fe$_2$O$_3$, Fe$_3$O$_4$, Co-containing Fe$_3$O$_4$, Co-adhered Fe$_3$O$_4$ and CrO$_2$; magnetic powders of metals and alloys composed mainly of Fe, Ni, Co, such as Fe, Ni, Co, Fe-Al alloys, Fe-Al-Ni alloys, Fe-Al-Co alloys, Fe-Al-Zn alloys, Fe-Ni-Co alloys, Fe-Mn-Zn alloys, Fe-Ni alloys, Fe-Ni-Al alloys, Fe-Ni-Zn alloys, Fe-Co-Ni-Cr alloys, Fe-Co-Ni-P alloys and Co-Ni alloys; and hexagonal ferrites represented by the formula M'O[Fe$_{12-x}$M$_x$O$_{18}$].

Of these ferromagnetic powders, preferred are powders of aluminum-containing metals, powders of Fe-Ni metal alloys and hexagonal ferrite powders. It is preferable that the aluminum atom content of the afore-mentioned magnetic powder of aluminum-containing metal be 1 to 20%, more specifically 100:1 to 100:20 by number of atoms as expressed by the content ratio of iron atoms and aluminum atoms (Fe:Al) in the metal magnetic powder.

This aluminum content is preferably 100:1 to 100:10 as Fe:Al ratio, more preferably 100:2 to 100:8, and it is ideal that aluminum be present on the surface of the metal magnetic powder. In addition to Al atoms, Ni, Co, Si, S, Sc, Ti, Cr, Mn, Cu and other atoms may be contained in the range of not more than 20%.

The specific surface area, BET, of this metal magnetic powder is preferably not less than 30 m$^2$/g, more preferably 40 to 55 m$^2$/g. Also, the coercive force, Hc, is preferably not less than 1200 Oe as the Hc of sheet, more preferably not less than 1500 Oe.

The Fe-Ni metal magnetic powder preferably has an iron atom content of not less than 80% by atomic weight and a nickel atom content of 2 to 20% by atomic weight. More preferably, the nickel content be 5 to 10% by atomic weight. In addition to nickel, Co, Al, Si, Ca, Mg and other elements may be contained.

Such a metal magnetic powder is high in packing density, high in corrosion resistance due to the containment of nickel and good in dispersibility. These features are favorable for high density recording, since sufficient dispersibility is obtained even when the specific surface area of magnetic powder is increased.

The specific surface area, BET, of this metal magnetic powder is preferably not less than 30 m$^2$/g, more preferably 40 to 55 m$^2$/g. Also, the coercive force, Hc, is preferably not less than 1200 Oe as the Hc of sheet, more preferably not less than 1500 Oe.

Also, the hexagonal ferrite can easily be oriented vertically by magnetic or mechanical orientation and permits us to obtain a recording medium suitable for vertical magnetic recording because it is in a tabular form, the ratio d/t of diameter d to thickness t is referred to as aspect ratio and its magnetizable axis is at a right angle with the tabular plain. In addition, the hexagonal ferrite is capable of recording short wavelength data with high efficiency.

A hexagonal ferrite magnetic powder is represented by the formula:

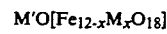

wherein M' represents a divalent metal such as Ba, Sr or Pb; M represents at least one metal or combination of metals such as In, Co-Ti, Co-V, Zn-Ge, Zn-Nb or Zn-V; x is defined as $3 \geq x \geq 0$.

Of the magnetic materials described above, preferred is a Ba-ferrite magnetic powder having Ba for M'. Also, the grain size, the length d of the diagonal line of tubular face, is preferably 0.01 to 0.5 μm, more preferably 0.05 to 0.3 μm. The aspect ratio, the length d of the diagonal line/tabular thickness t, is preferably 2 to 20, more preferably 4 to 10.

This ferrite magnetic material is described in detail in IEEE Trans. on Mag., MAG-18, 16 (1982) and other references.

As a binder to bind the magnetic powder, a modified polyurethane resin having a $-SO_3M$, $-OSO_3M$, $-COOM$, $-PO(OM)_2$, $-OPO(OM)_2$ or OH group is used, in which M represents a hydrogen atom or an alkali metal atom, and the $-SO_3M$, $-OSO_3M$, $-COOM$, $-PO(OM)_2$ or $-OPO(OM)_2$ group may form an intramolecular salt, as stated above, but the binder may incorporate another resin.

Examples of binder resins other than modified polyurethane used for the present invention include polyester, epoxy resins, phenoxy resins, cellulose resins and vinyl chloride resins. Adding a cellulose resin or a vinyl chloride resin further improves the dispersibility of the magnetic powder in the magnetic layer and increases its mechanical strength. Although the layer becomes too hard when a cellulose resin or a vinyl chloride resin alone is used, this can be prevented by containment of the afore-mentioned modified polyurethane. Of the other binder resins, vinyl chloride resins are preferred, with further preference given to those having a polar functional group in the molecular structure.

Also, in addition to the binders described above, mixtures with other thermoplastic resins, thermosetting resins, reactive resins or electron beam irradiation setting resins may be used.

Usable cellulose resins include cellulose ether, inorganic acid esters of cellulose and organic acid esters of cellulose. The vinyl chloride copolymer may be partially hydrolyzed. Preferred is a vinyl chloride copolymer containing vinyl chloride-vinyl acetate. Phenoxy resins can also be used. They are advantageous in that they are great in mechanical strength, excellent in di-mensional stability, high in heat resistance, water resistance and chemical resistance, and good in adhesion.

These advantages noticeably increase the time-related stability of the magnetic layer's physical properties in cooperation with the afore-mentioned modified polyurethane.

Also, the afore-mentioned other binder resins may incorporate a modified vinyl chloride resin having a polar group such as a sulfo group, a phospho group or a carboxyl group, or a salt thereof, and an epoxy group. The afore-mentioned polar group is preferably a sulfo group, a phospho group, a carboxyl group or a salt thereof, with Li, K or Na preferred as the metal which forms a salt with these acids. These functional groups may exist in any condition, but it is preferable that they form a part of a copolymer.

Introducing the afore-mentioned polar group into vinyl chloride resin further improves the dispersibility of the magnetic powder, with preference given to a sulfo group and a salt-forming sulfo group.

Also, introducing an epoxy group into the binder improves film strength and heat stability. Introducing a hydroxyl group strengthens the crosslinking structure of isocyanate and increases the hardness of the magnetic layer, thus increasing the durability with respect to sliding with head and impact.

As stated above, by using a modified vinyl chloride resin incorporating a given polar group, and an epoxy group if necessary, and a modified polyurethane resin incorporating a given polar group, the polar groups of the vinyl chloride resin and the modified polyurethane resin act to improve the affinity with ferromagnetic powder and makes the ferromagnetic powder appropriately dispersed in the magnetic layer. Thus, high reproduction output is obtained, since the squareness ratio of the magnetic layer increases. Furthermore, since only little ferromagnetic powder is dispersed in an aggregated form, the ferromagnetic powder is not detached at running; therefore, occurrence of magnetic head clogging is reduced.

In a preferred mode of embodiment of the present invention, a modified polyurethane having $-SO_3M$, $-OSO_3M$, $-COOM$, $-PO(OM)_2$ or $-OPO(OM)_2$ is used, where M represents a hydrogen atom or an alkali metal atom such as lithium sodium or potassium. In this case, it is preferable to use the modified polyurethane resin in combination with a modified polyvinyl chloride resin having $-SO_3M$, $-OSO_3M$, $-COOM$, $-PO(OM)_2$ or $-OPO(OM)_2$ in which M has the same definition as above.

Such a modified polyurethane resin can, for example, be produced as follows:

Generally, polyurethane resin is synthesized by reaction of polyisocyanate and polyol. As these components, those having in their molecular structure a polar group as described above are used. Examples of usable polyols include polyester polyols synthesized by reaction of an organic dibasic acid such as phthalic acid, adipic acid, dimerized linoleic acid and maleic acid, and any two or more polyols selected from the group comprising glycols such as ethylene glycol, propylene glycol, butylene glycol and diethylene glycol, or polyhydric alcohols such as trimethylolpropane, hexanetriol, glycerol, trimethylolpropane, hexanetriol, trimethylolethane and pentaerythritol; lactone-derived polyester polyols synthesized from a lactone such as $\epsilon$-caprolactone, $\delta$-caprolactone, $\gamma$-caprolactone and 1-metlry-$\epsilon$-caprolactone and polyether polyols synthesized from ethylene oxide, propylene oxide, butyrene oxide or the like. These polyols are reacted with an isocyanate compound such as trilene diisocyanate, methylene diisocyanate and methaxylylene diisocyanate to synthesize urethanized polyester polyurethanes and polyether polyurethanes or polycarbonate polyurethanes carbonated with phosgen or diphenyl carbonate. These polyurethanes are normally produced mainly by reaction of polyisocyanate and polyol, and may be in the form of an urethane resin or urethane prepolymer containing a free isocyanate group and/or a hydroxyl group, or those having none of these reactive terminal groups, e.g., urethane elastomer.

Here, the production methods, crosslinking setting methods, and other methods for polyurethane, urethane prepolymer and urethane elastomer are not described in detail, since they are already in public knowledge.

Also, it is possible to use the method of introducing a polar group into polyurethane resin by producing a polyurethane resin incorporating a OH group and reacting this polyurethane resin with one of the compounds containing a polar group and chlorine described below with dehydrochlorization.

$ClCH_2CH_2SO_3M$
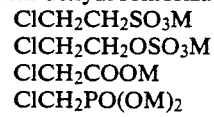
$ClCH_2COOM$
$ClCH_2PO(OM)_2$

It is preferred that reaction conditions be set so that the weight-average molecular weight of this modified polyurethane resin falls in the range of from 10,000 to 150,000, preferably 20,000 to 60,000.

With respect to the polyurethane resin described above, it is preferred that the content of the repeating unit having a polar group in the copolymer be normally 0.01 to 5 mol %, preferably 0.1 to 2.0 mol %.

The modified vinyl chloride resin used offers good dispersion for magnetic powder and improves mechanical strength of the magnetic layer, and when used in combination with a modified polyurethane resin, it improves the abrasion resistance of the magnetic layer and provides appropriate flexibility.

These resins contain one or more hydrophilic groups represented by $-SO_3M$, $-OSO_3M$, $-COOM$, $-PO(OM)_2$ or $-OPO(OM)_2$, in which M represents an alkali metal such as lithium, potassium and sodium. Accordingly, compatibility between resin and magnetic powder is improved by these intramolecular polar groups, which improves the dispersibility of magnetic powder and prevent magnetic powder coagulation, and which in turn improves the durability of the medium.

A modified vinyl chloride resin having both at least one polar group selected from COOM, $SO_3M$, $SO_4M$, $PO_3M_2$ and $PO_4M_2$ and, if necessary, an epoxy group, can be obtained by (1) the method in which a radical polymerizable monomer having the polar group to be contained in the resin and a monomer having an epoxy group if necessary, along with another copolymerizable monomer if necessary, are copolymerized with vinyl chloride, (2) the method in which a monomer having an epoxy group if necessary, along with another copolymerizable monomer if necessary, are copolymerized with vinyl chloride in the presence of a radical releasing agent having the polar group to be contained in the resin, or (3) the method in which a copolymer of a monomer having an epoxy group if necessary, vinyl chloride and another monomer used as necessary is partially reacted with a compound having the polar group to be contained in the resin. These methods can be used in combination.

Examples of epoxy-containing monomers usable to produce these modified vinyl chloride resins having both a polar group and an epoxy group include glycidyl ethers of unsaturated alcohols, such as arylglycidyl ethers; glycidyl esters of unsaturated acids, such as glycidyl acrylate, glycidyl methacrylate, glycidyl-p-vinylbenzoate, methylglycidyl itaconate, glycidyl ethylmaleate, glycidyl vinylsulfonate and glycidyl (metha)arylsulfonate; and epoxide olefins such as butadiene monoxide, vinyl cyclohexene monoxide and 2-methyl-5,6-epoxyhexene.

Examples of the monomer having a polar group used to produce the modified vinyl chloride resin of the present invention in the method (1) described above include unsaturated monocarboxylic acids such as acrylic acid and methacrylic acid and unsaturated dicarboxylic acids such as fumaric acid and itaconic acid and their monoesters for example of monomer having a COOM group.

Examples for $SO_3M$-having monomer include acids such as vinylsulfonic acid, methylvinylsulfonic acid, (meth)arylsulfonic acid, styrenesulfonic acid, ethyl (meth)acrylic acid-2-sulfonate, 2-acrylamido-2-methylpropanesulfonic acid and 3-aryloxy-2-hydroxypropanesulfonic acid and their alkali metal salts and ammonium salts. Examples for $SO_4M$-having monomer include acids such as ethyl (meth)acrylate-2-sulfate and 3-aryloxy-2-hydroxypropanesulfuric acid and their alkali metal salts and ammonium salts.

Examples for $PO_4M'_2$-having monomer include acids such as propyl (meth)acrylate-3-chloro-2-phosphate, ethyl (meth)acrylate-2-phosphate and 3-aryloxy-2-hydroxypropanephosphoric acid and their alkali metal salts or ammonium salts. Examples for $PO_3M'_2$-having monomer include acids such as vinylphosphonic acid, acrylamidomethanephosphonic acid, ethyl 2-phosphonate-(meth)acrylate and 3-aryloxy-2-hydroxypropanephosphonic acid and their alkali metal salts and ammonium salts.

Examples of the radical releasing agent having a polar group used in the method (2) described above include 4,4'-azobis-4-cyanovaleric acid for COOM, potassium persulfate and ammonium persulfate for $SO_4M$, potassium perphosphate and sodium perphosphate for $PO_4M_2$.

Examples of the compound used to introduce a polar group into the resin by reaction with a copolymer of an epoxy-containing monomer and vinyl chloride in the method (3) described above include malonic acid and phthalic acid for COOM, sodium sulfite, ammonium sulfite, sodium bisulfite, potassium bisulfite, ammonium thiosulfate, sodium salt of taurine, sodium sulfamate and sodium sulfamate for $SO_3M$, sodium bisulfate, ammonium bisulfate and sodium 2-aminoethylsulfate for $SO_4M$, sodium hydrogen phosphite and ammonium hydrogen phosphite for $PO_3M_2$ and dipotassium hydrogen phosphate and disodium hydrogen phosphate for $PO_4M_2$.

Examples of the monomer used as necessary other than the epoxy-containing monomer, vinyl chloride and the monomer having a hydrophilic group include vinyl carboxylates such as vinyl acetate and vinyl propionate; vinyl ethers such as methyl vinyl ether, isobutyl vinyl ether and cetyl vinyl ether; vinylidenes such as vinylidene chloride and vinylidene fluoride; esters of unsaturated carboxylic acids, such as diethyl maleate, butylbenzyl maleate, di-2-hydroxyethyl maleate, dimethyl itaconate, methyl (meth)acrylate, ethyl (meth)acrylate, lauryl (meth)acrylate and 2-hydroxypropyl (meth)acrylate; olefins such as ethylene and propylene; unsaturated nitriles such as (meth)acrylonitrile; and aromatic vinyls such as styrene, α-methylstyrene and p-methylstyrene. These monomers are selected appropriately as needed to improve coating film properties and coating process workability as well as to improve resin solubility while regulating the compatibility and softening point of a combination of the resin of the present invention and another resin in mixture.

Copolymerization of an epoxy-containing monomer and vinyl chloride or copolymerization of an epoxy-containing monomer, a monomer having a hydrophilic group and vinyl chloride can be achieved by an ordinary polymerization method, including the case where another monomer is also copolymerized. Reaction of a copolymer of an epoxy-containing monomer, vinyl chloride and another monomer used as necessary with a compound having a hydrophilic group can also be achieved by an ordinary method according to operational aspects such as starting material properties and product separation.

Introduction of a polar group into vinyl chloride copolymer is described in Japanese Patent Publication Open to Public Inspection Nos. 44227/1982, 108032/1983, 8127/1984, 101161/1985, 235814/1985, 238306/1985, 238309/1985 and 238371/1985, and these methods can be used for the present invention.

It is desirable that the content of the polar group bound to the modified vinyl chloride resin thus obtained, having at least one polar group selected from COOM, SO₃M, SO₄M, PO₃M₂ and PO₄M₂ and, if necessary, an epoxy-containing group, is 0.05 to 4.0 wt % as —COO, —SO₃, —SO₄, —PO₄ or —PO₃.

The modified vinyl chloride resin according to the present invention preferably has an epoxy group content of not less than 0.05 wt %.

The modified vinyl chloride resin described above preferably has an average degree of polymerization of 100 to 900, more preferably 200 to 500, and a vinyl chloride content of not less than 60 wt %.

In this mode of embodiment, and it is preferred that the afore-mention modified vinyl chloride resin and polyurethane resin be used in the range of from 80:20 to 20:80, preferably 70:30 to 40:60 by weight.

In another preferred mode of embodiment of the present invention, a modified polyurethane resin containing hydroxyl-containing repeating units is used as binder. In this case, it is particularly preferable to use the polyurethane resin in combination with the afore-mentioned modified polyvinyl chloride resin having a —SO₃M, —OSO₃M, —COOM, —PO(OM)₂ or —OPO(OM)₂ group.

Such a polyurethane resin having a hydroxyl group can, for example, be produced as follows:

A polyester polyol having a terminal hydroxyl group and/or a polyol ether polyol (A), a diol (B), a polyol having at least one hydroxyl group and/or a polyester polyol comprising the polyol and/or a polyether polyol (C) and a diisocyanate (D) are polymerized so that the molar ratio of (C)/{(A)+(B)+(C)} becomes 0.01 to 5 mol %.

Examples of the afore-mentioned polyester polyol and/or polyether polyol (A) include polyether polyols such as polyethylene glycol, polypropylene glycol and polytetramethylene glycol; polyester polyols obtained by polycondensation of a glycol such as ethylene glycol, 1,2-propylene glycol, 1,3-propylene glycol, 1,4-butylene glycol, 2,2'-dimethyl-1,3-propanediol, diethylene glycol, 1,5-pentamethylene-glycol, 1,7-hexane glycol, cyclohexane-1,4-diol or cyclohexane-1,4-dimethanol or their mixture, and a dibasic acid such as succinic acid, maleic acid, adipic acid, glutaric acid, pimelic acid, suberic acid, azelaic acid, sebacic acid, phthalic acid, isophthalic acid, terephthalic acid, hexahydroterephthalic acid or hexahydroisophthalic acid, their acid ester or acid halide; and polycaprolactone diols obtained by cyclizing addition polymerization of a lactone such as γ-caprolactone in the presence of glycol or the like.

As the diol (B) described above, a glycol used to produce the afore-mentioned polyester can be used singly or in mixture. Also, a diol resulting from addition of 2 to 4 mol of ethylene oxide to hydroquinone can be used.

The hydroxyl group contained in the afore-mentioned polyol (C) may be primary, secondary or terptiary. Examples of such polyols include glycerol, trimethylolpropane, trimethylolethane, pentaerythritol, 1,2,3-hydroxy-2-methylpropane, 1,2,3-hydroxy-2-ethylpropane, 1,2,4-hydroxy-2-methylbutane, 1,2,5-hydroxy-2-methylpentane, 1,3,5-hydroxy-3-methylpentane, 1,3,6-hydropxy-3-methylhexane, 1,2,3,6-hydroxy-2,3-dimethylhexane, 1,2,4,6-hydroxy-2,4-dimethylhexane, used singly or in mixture.

The polyether polyols include polypropylene ether polyols, polyethylene polyols and polybutylene polyols, prepared by adding propylene oxide and/or ethylene oxide and/or butylene oxide to the afore-mentioned polyol.

The polyol components also include polyesters obtained by polycondensation with dibasic acid, its acid ester or acid halide in a mixture system with another glycol, including mixtures of a lactone such as τ-caprolactone with triol, tetrol, pentol, hexol or glycol, and polycaprolactones polyadded to the afore-mentioned polyol.

Examples of the isocyanate (D) include hexamethylene diisocyanate, lysine diisocyanate, isophorone diisocyanate, xylene diisocyanate, cyclohexane diisocyanate, toluidine diisocyanate, 2,4-tolylene diisocyanate, 2,6-tolylene diisocyanate, 4,4'-diphenylmethane diisocyanate, p-phenylene diisocyanate, m-phenylne diisocyanate, 1,5-naphthylene diisocyanate, 4,4'-biphenyl diisocyanate, 3,3'-dimethylbiphenyl-4,4'-diisocyanate, 3,3'-dimethoxybiphenyl-4,4'-diisocyanate and their mixtures. Of these, 4,4'-diphenylmethane diisocyanate, hexamethylene diisocyanate, 2,4- and 2,6-tolylene diisocyanates and their mixtures are preferred.

It is preferred that reaction conditions be set so that the weight-average molecular weight of this modified polyurethane resin falls in the range of from 10,000 to 150,000, preferably 20,000 to 70,000.

Also, the modified polyurethane resin described above is preferably 0.01 to 5 mol %, more preferably 0.1 to 3.0 mol %, in the content of the hydroxyl-containing repeating unit in the copolymer.

The glass transition point (Tg) of this resin is preferably above 0° C., more preferably above 20° C.

The binder for the magnetic layer of the present invention comprises a combination of the vinyl chloride resin having a polar group and hydroxyl group-containing modified polyurethane resin described above, and it is preferred that the vinyl chloride resin and modified polyurethane resin be used in the range of from 80:20 to 20:80, preferably 70:30 to 40:60 by weight.

Still another preferred mode of embodiment of the present invention uses as binder a modified polyurethane resin having both at least one of —SO₃M, —OSO₃M, —COOM, —PO(OM)₂ and —OPO(OM)₂ and a hydroxyl group. In this case, it is particularly preferable to use the afore-mentioned polyurethane resin in combination with the afore-mentioned modified polyvinyl chloride resin having —SO₃M, —OSO₃M, —COOM, —PO(OM)₂ or —OPO(OM)₂.

Such a modified polyurethane resin can, for example, be produced as follows:

Generally, polyurethane resin is synthesized by reaction of polyisocyanate and polyol. Those having the polar group or hydroxyl group described above in its molecular structure are used for this reaction. Examples of usable polyol components include polyester polyols synthesize by reaction of an organic dibasic acid such as phthalic acid, adipic acid, dimerized linoleic acid or maleic acid, and a glycol such as ethylene glycol, propylene glycol, butylene glycol or diethylene glycol; lactone-derived polyester polyols synthesized from lactones such as ε-caprolactone, δ-caprolactone, α-caprolactone and 1-methyl-ε-caprolactone; and polyether polyols synthesized from ethylene oxide, propylene oxide, butylene oxide and so forth. These polyols are reacted with an isocyanate compound such as tolylene diisocyanate, hexamethylene diisocyanate, methylene diisocyanate or methaxylylene diisocyanate, whereby urethanated polyester polyurethane, polyether polyurethane, and polycarbonate polyurethane carbonated with phosgen or diphenylcarbonate are synthesized. These polyurethanes are usually produced mainly by reaction of polyisocyanate and polyol, and they may be in the form of an urethane resin or urethane prepolymer having a free isocyante group and/or a hydroxyl group, or may have none of these reactive terminal groups, e.g., in the form of urethane elastomer.

It is preferred that reaction conditions be set so that the weight-average molecular weight of this modified polyurethane resin falls in the range of from 5000 to 150000, preferably 10000 to 600000.

Also, it is preferred that the afore-mentioned modified polyurethane resin be in the range of from 0.01 to 5 mol %, preferably 0.1 to 2.0 mol %, in the content of the repeat unit having a polar group in the copolymer. It is preferable that the hydroxyl group content in this resin be 0.1 to 20 mol %, more preferably 1.0 to 5.0 mol %, as the ratio of the repeat unit having a hydroxyl group.

The binder for the magnetic layer of this mode of embodiment comprises a combination of the afore-mentioned modified vinyl chloride resin and modified polyurethane resin, and it is recommended that the modified vinyl chloride resin and modified polyurethane resin be used in the range of from 80:20 to 20:80, preferably 70:30 to 40:60, by weight.

In another preferred mode of embodiment of the present invention, a modified polyurethane resin wherein the polar group contained in its molecular structure, namely the —$SO_3M$, —$OSO_3M$, —COOM, —PO(OM)$_2$ or —OPO(OM)$_2$ group (M represents a hydrogen atom), forms an intramolecular salt is used as binder.

This polyurethane is described below.

As in the ordinary method of polyurethane synthesis, a high molecular polyol (molecular weight 500 to 3000) such as polycarbonate polyol, polyester polyol, polylactone polyol or polyether polyol and a polyfunctional aromatic or aliphatic isocyanate are reacted, whereby polyester polyurethane, polyether polyurethane or a polycarbonate polyurethane carbonated with phosgene or diphenyl carbonate is synthesized.

These polyurethanes are produced mainly be reaction of polyisocyanate and polyol and, if necessary, another copolymer, and they may be in the form of an urethane resin or urethane prepolymer containing a free isocyanate group and/or a hydroxyl group, or may have none of these reactive terminal groups, e.g., in the form of urethane elastomer. As isocyanate components, various diisocyanate compounds can be used, such as hexamethylene diisocyanate (HMDI), diphenylmethane diisocyanate (MDI), hydrogenated MDI ($H_{12}MDI$), toluene diisocyanate (TDI), 1,5-naphthalene diisocyanate (NDI), tolidine diisocyanate (TODI), lysine diisocyanate methyl ester (LDI) and isophorone diisocyanate (IPDI). Also, as necessary, a low molecular polyfunctional alcohol such as 1,4-butanediol, 1,6-hexanediol or 1,3-butanediol is used to regulate the molecular weight, resin properties, etc.

The polar group forming the intramolecular salt may be introduced into the isocyanate component, but may also be introduced to the polyol component, and may still also be introduced into the low molecular polyfunctional alcohol described above.

A polyester polyol wherein an anionic polar group forms an intramolecular salt can be synthesized by polycondensation of various dicarboxylic acid components, a polyhydric alcohol component, and a dicarboxylic acid component wherein the anionic polar group forms an intramolecular salt and/or a polyhydric alcohol component wherein the anionic polar group forms an intramolecular salt. Examples of dicarboxylic acid components include terephthalic acid, isophthalic acid, cevacic acid, adipic acid, dimerized linoleic acid and maleic acid. Examples of polyhydric alcohol components include glycols such as ethylene glycol, propylene glycol, butylene glycol and diethylene glycol; polyhydric alcohols such as trimethylolpropane, hexanetriol, glycerol, trimethylolpropane, trimethylolethane and pentaerythritol; and combinations of a glycol and a polyhydric alcohol selected from these glycols and polyhydric alcohols.

A polycarbonate polyol wherein an anionic polar group forms an intramolecular salt can be synthetically obtained by the ester exchange method between polyhydric alcohol and dialkyl carbonate or diallyl carbonate, or by condensation of polyhydric alcohol and phosgene.

In producing the polyester polyol or polycarbonate polyol including polycarbonate polyester polyol described above, the aromatic polyhydric alcohols listed below can be used. Also, in the reaction of the polyester polyol or polycarbonate polyol described above with polyisocyanate, the aromatic polyhydric alcohols listed below can be used. Aromatic polyhydric alcohols:

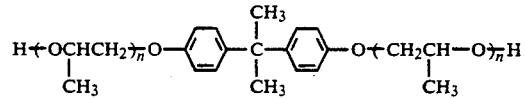

wherein n represents 1 or 2.

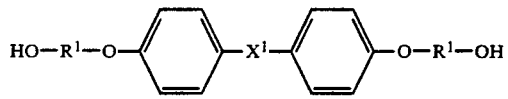

wherein $R^1$ represents —$(CH_2)_2$— or —CH(CH$_3$)—CH$_2$—CH$_2$—; $X^1$ represents —$SO_2$—, —CO—, —C(CH$_3$)$_2$— or —C(CH$_3$)$_2$—C$_6$H$_4$—C(CH$_3$)$_2$—.

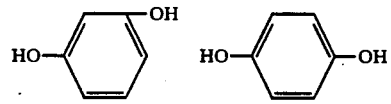

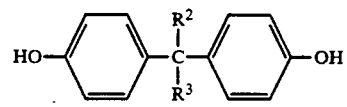

wherein $R^2$ represents a hydrogen atom or an alkyl group having a carbon number of 1 to 3; $R^3$ represents a hydrogen atom, an alkyl group having a carbon number of 1 to 7, or an aryl group.

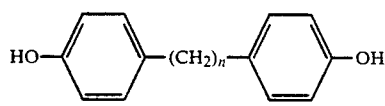

wherein n represents an integer of 1 to 10.

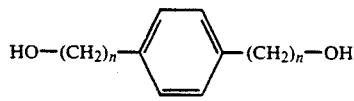

wherein n represents 1 or 2.

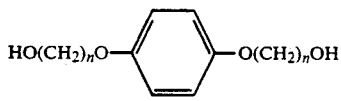

wherein n represents 1 or 2.

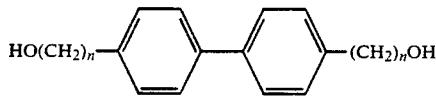

wherein n represents 1 or 2.

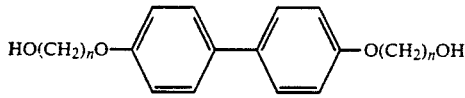

wherein n represents 1 or 2.

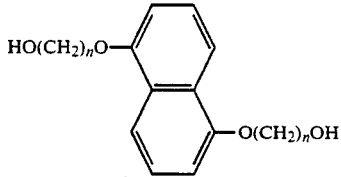

wherein n represents 1 or 2.

In the polyurethanes having these aromatic polyhydric alcohol components in their main chain, it is preferable that the content of these components be not less than 2 mol % of the total amount of the polyhydric alcohol components.

To produce a lactone-derived polyester polyol wherein wherein an anionic polar group forms an intramolecular salt, the polar group described above is introduced into a lactone such as α-caprolactone, ⊕-caprolactone or γ-caprolactone.

To produce a polyether polyol wherein an anionic polar group forms an intramolecular salt, the functional group described above is introduced into, for example, ethylene oxide, propylene oxide, butylene oxide.

Examples of the form of intramolecular salt include the betaine group described below.

The polyester polyol wherein an anionic polar group forms an intramolecular salt is described in more detail below.

Ordinary methods of polyester synthesis are carried out by condensation of an acid component having an aliphatic or aromatic polyfunctional group or its derivative and an aliphatic or aromatic polyfunctional alcohol component. The intramolecular amphoteric base, e.g., betaine group, of the present invention may be contained in any of the acid component or alcohol component described above. It is also possible to use the method in which a betaine group or the like is introduced into the polymer by polymer reaction. However, in view of unreacted components and introduction efficiency, operational control is easier when the functional group is present in the polymer's monomer component.

Examples of the betaine group according to the present invention include the sulfobetaine group, phosphobetaine group and carboxybetaine group. The sulfobetaine group and the phosphobetaine group are preferred, with further preference given to the sulfobetaine group. These betaine type functional groups are represented by the following formulas:

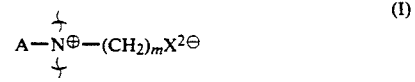 (I)

wherein ✢ indicates the state of containment in the urethane chain; $X^2$ represents $-SO_3^\ominus$, $-O-SO_3^\ominus$, $-COO^\ominus$, $-O-PO_3H^\ominus$, $-OPO_3$ or $-OPO_2H_2^\ominus$; A represents a hydrogen atom or an alkyl group having a carbon number of 1 to 60 such as a methyl group and an ethyl group; m represents an integer of 1 to 10.

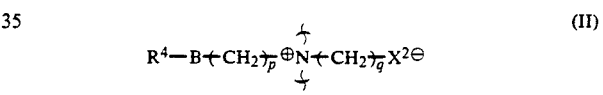 (II)

wherein B represents $-COO-$ or $-CONH-$; $R^4$ represents an alkyl group having a carbon number of 1 to 12, an alkenyl group or an aryl group; p and q independently represent an integer of 1 to 10.

Examples of usable betaine-containing monomers include the following example compounds.

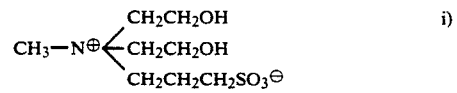 i)

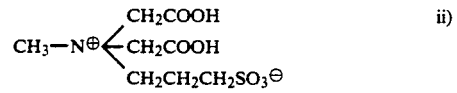 ii)

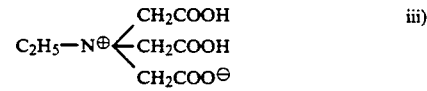 iii)

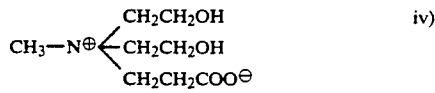 iv)

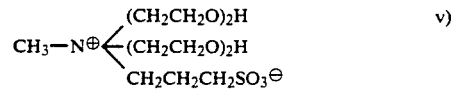 v)

-continued

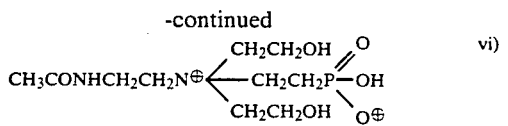

The afore-mentioned monomer wherein an anionic polar group forms an intramolecular salt is available as a commercial chemical product, but can also easily be obtained by the methods described below.

1) Synthetic method using monochloroacetic acid

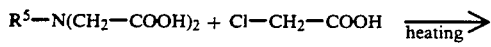

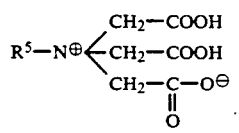

wherein $R^5$ represents an alkyl group such as a methyl group and an ethyl group.

2) Synthetic method using monochlorosuccinic acid

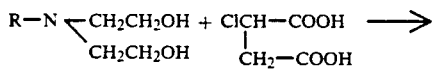

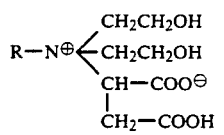

(3) Synthetic method using propane sultone

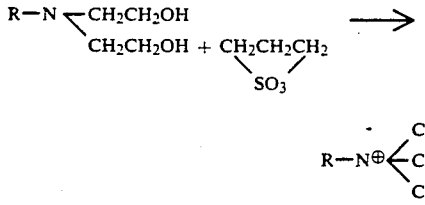

The polymer reaction to introduce a betaine group into the polymer is described below. In this reaction, a compound having a betaine group is reacted with the OH group present in the terminal or side chain of a polyurethane whose chain has been extended to a given molecular weight by polymerization. In this case, a compound having both a hydroxyl group and a betaine group is first synthesized and subjected to molar reaction with a polyfunctional isocyanate such as diisocyanate to cause reaction of one NCO group in the diisocyanate with the hydroxyl group in the compound described above. Then, the OH group in the polyurethane and the other unreacted NCO group are reacted to yield a polyurethane incorporating a betaine group.

Examples of the compound having both a hydroxyl group and a betaine group described above include the compounds shown below.

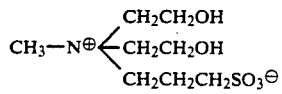

-continued

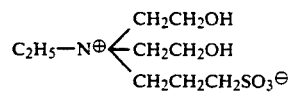

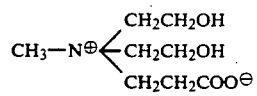

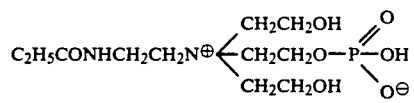

It is preferable that the ratio of an intramolecule salt such as a betaine group introduced into the modified polyurethane described above for the present invention be 0.01 to 1.0 mmol/g, more preferably 0.1 to 0.5 mmol/g.

It is also preferable that the number-average molecular weight of the modified polyurethane resin described above be 5000 to 100000, more preferably 10000 to 40000.

SYNTHETIC EXAMPLE

One mol of N-methyldiethanolamine and 1 mol of propanesultone were reacted at 120° C. for 3 hours to yield a sulfobetaine type polyfunctional monomer.

Next, 1.5 mol of adipic acid, 1.7 mol of 1,4-butanediol and 0.06 mol of the sulfobetaine type acid base polyfunctional monomer were mixed, followed by heating at 150° to 200° C. over a period of about 3 hours. After a temperature of 200° C. was reached, reaction was continued at constant temperature for 4 hours. Then, the unreacted portion of the starting materials was removed at 3 to 5 mmHg, followed by reaction until the acid value reached below 2. The obtained copolymerized polyester had a weight-average molecular weight of 2500. This copolymerized polyester, in an amount of 165 g, was dissolved in 300 parts of methyl ethyl ketone. To this solution, 80 parts of diphenylmethane diisocyanate was added, followed by reaction at 80° C. for 20 hours. Then, 20 parts of 1,4-butanediol was added, followed by reaction for 2 more hours. Then, 4 parts of 1,3-butanediol was added, followed by reaction for 1 hour. The obtained polyurethane had a weight-average molecular weight of 35000 and a number-average molecular weight of 22000.

As in the synthetic example given above, the following betaine type polyurethanes were synthesized.

(A) Polyurethane containing sulfobetaine type modifying group (Betain-containing polyurethane H)
Number-average molecular weight: 22000
Tg: +20° C.
Polar group content: 0.04 mmol/g

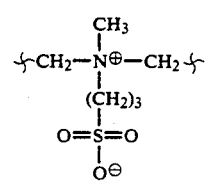

Polyester type polyurethane chain (B) Polyurethane containing carboxybetaine type modifying group (Betain-containing polyurethane J)
Number-average molecular weight: 30000
Tg: +50° C.
Polar group content: 0.04 mmol/g

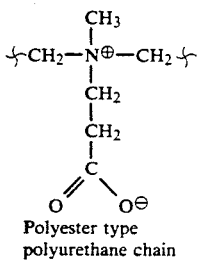

Polyester type
polyurethane chain (C) Polyurethane containing phosphobetaine type modifying group (Betain-containing polyurethane K)
Number-average molecular weight: 30000
Tg: 0° C.
Polar group content: 0.07 mmol/g

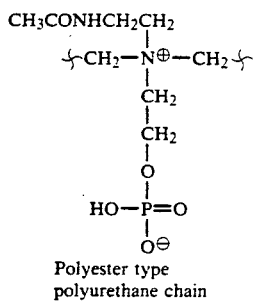

Polyester type
polyurethane chain

By using the polyurethane containing an intramolecular salt of a functional group such as a betaine group, described above, magnetic layer durability improves. Particularly, introducing a betaine group improves the dispersibility of cobalt-containing magnetic powder.

The modified polyurethane resin having a polar group forming an intramolecular salt can be advantageously used in combination with a modified vinyl chloride resin having —SO$_3$M, —OSO$_3$M, —COOM, —PO(OM)$_2$ or —OPO(OM)$_2$, in which M represents a hydrogen atom or an alkali metal atom.

The mixing ratio of the modified vinyl chloride resin described above and the modified polyurethane forming an intramolecular salt is 80:20 to 20:80, preferably 70:30 to 40:60.

To improve the durability of magnetic layer, various curing agens such as isocyanate may be added to the magnetic coating composition.

Examples of usable aromatic isocyanates include tolylene diisocyanate (TDI) and active hydrogen compound adducts of these isocyanates, with preference given to those having an average molecular weight of 100 to 3000.

Examples of usable aliphatic isocyanates include hexamethylene diisocyanate (HMDI) and active hydrogen compound adducts of these isocyanates. Of these aliphatic isocyanates and active hydrogen compound adducts of these isocyanates, those having an average molecular weight of 100 to 3000 are preferred. Of the aliphatic isocyanates, nonalicyclic isocyanates and active hydrogen compound adducts of these compounds are preferred.

In addition to the magnetic powders and binders described above, a lubricant, e.g., silicone oil, graphite, molybdenum disulfide, tungsten disulfide, a monobasic fatty acid such as stearic acid, a fatty acid ester, may be added to the magnetic layer of the present invention. Also, grains of a nonmagnetic abrasive may be added, such as alumina, e.g., α-Al$_2$O$_3$, corundum, synthetic corundum, fused alumina, silicon carbide, chromium oxide, diamond, synthetic diamond, garnet, emery (main components: corundum and magnetite). It is preferable that the content of this abrasive material be not more than 20 parts by weight to the magnetic powder, and that its average grain size be not more than 0.5 μm, more preferably not more than 0.4 μm. The magnetic layer described above may contain an antistatic agent such as carbon black.

In the disc according to the present invention, it is preferable that a fatty acid ester having an unsaturated bond in its molecular structure be contained in the magnetic layer.

The fatty acid ester contained in the magnetic layer shows sufficient lubricating action even at low and high temperatures with little surface exudation; therefore, it can be used to retain the abrasion resistance of the magnetic layer in a wide temperature range from low to high temperatures. This feature, in conjunction with the effect of liner composition described above, contributes to long retention of the durability and reliability of the magnetic layer under any circumstances.

It is preferable that this fatty acid ester have a high molecular weight and be in the form of a liquid at normal temperature. Examples of such fatty acid esters include esters of an unsaturated fatty acid such as oleic acid, erucic acid, linolic acid or linolenic acid with a monohydric alcohol having a carbon number of about 6 to 18, a polyhydric glycol, glycerol, sorbitan or pentaerythritol. Examples also include esters of an unsaturated alcohol such as oleyl alcohol with a fatty acid having a carbon number of about 8 to 18. These esters may be used singly or in combination.

It is preferable that the fatty acid ester described above be used in a ratio of 1 to 30 parts by weight, more preferably 2 to 20 parts by weight, to 100 parts by weight of the magnetic powder in the magnetic layer.

In the magnetic disc according to the present invention, it is preferable that the dry film thickness of the magnetic layer described above be 0.5 to 4.0 μm, more preferably 1.0 to 3.0 μm.

If a subbed layer 22 is formed under the magnetic layer, the subbed layer may be formed by coating various binders described above.

As the material for the support 21, a plastic material such as polyethylene terephthalate or polypropylene, a metal such as aluminum and zinc, glass, Si-carbide, a ceramic material such as porcelain and earthenware, is used.

The present invention may be applied to video floppy discs for electrophotographic still cameras as well as the floppy disc described above.

EXAMPLES

In the examples given below, "part(s)" means parts by weight. "E" and "C" indicate inventive samples and comparative samples, respectively.

Example 1

A composition listed in Table 2 below was dispersed using a sand mill. After being filtered through a 1 μm filter, the resulting coating composition was coated on a support, subjected to disorientation and calendering and other treatments to yield a magnetic disc medium.

Separately, an unwoven fabric liner of a composition shown in Table 2 was used as the inner shell for a 3.5-inch floppy disc, and the magnetic disc medium described above was placed in this shell to yield a 3.5-inch floppy disc.

The binders listed in Table 2 were as shown in Table 1 below.

TABLE 1

| | |
|---|---|
| Modified vinyl chloride resin 1: | Modified with metal salt of sulfonic acid, MR-110, produced by Nippon Zeon Co., Ltd. |
| Modified vinyl chloride resin 2: | Modified with COOH, 400 × 110A, produced by Nippon Zeon Co., Ltd. |
| Modified vinyl chloride resin 3: | Modified with phosphoric acid, DX-76, produced by Denki Kagaku Kogyo K.K. |
| Modified vinyl chloride resin 4: | Modified with potassium sulfonate (0.3 mol %) and COOH (0.3 mol %). |
| Vinyl chloride resin 5: | VAGH, produced by UCC K.K. |
| Modified polyurethane resin A: | Modified with COOH, TIM3005, produced by Sanyo Kagaku K.K. |
| Modified polyurethane resin B: | Modified with SO$_3$Na, UR-8300, produced by Toyobo Co., Ltd. |
| Polyurethane C: | N-2301, produced by Nippon Polyurethane Industry Co., Ltd. |

Each floppy disc sample thus obtained was placed in a 3.5-inch high density floppy disc drive, and recording was conducted at 250 KHz. Running time until reproduction output reaches 60% of the initial output in a heating cycle from 5° C. to 60° C. to evaluate the durability.

Also, these floppy discs were subjected to random seek. After 100 floppy disc samples were vibrated for 1 hour, the discs in which dropout occurred were counted to evaluate the reliability.

Reproduction output was measured after recording and reproduction at 250 KHz with the sample placed in a 3.5-inch high density floppy disc drive, expressed as percent ratio to the output obtained in Comparative Example 1-6.

The results are shown in Table 2.

TABLE 2

| Sample No. | E-1-1 | E-1-2 | E-1-3 | E-1-4 | E-1-5 | E-1-6 | E-1-7 | E-1-8 | E-1-9 |
|---|---|---|---|---|---|---|---|---|---|
| Co-γ-Fe$_2$O$_3$ (parts) | 100 | 100 | 100 | 100 | 100 | — | 100 | 100 | 100 |
| Fe-based metal powder (parts) | — | — | — | — | — | 100 | — | — | — |
| Vinyl chloride resin (parts) | (2) 20 | (3) 20 | (1) 20 | (1) 20 | (1) 20 | (1) 12 | (1) 20 | (1) 20 | (1) 20 |
| Polyurethane (parts) | (A) 8 | (B) 8 | (B) 8 | (A) 8 | (A) 8 | (B) 8 | (A) 8 | (A) 8 | (A) 8 |
| Carbon black (parts) | 12 | 12 | 12 | 12 | 12 | 12 | 12 | 12 | 12 |
| Alumina (parts) | 10 | 10 | 10 | 10 | 10 | 10 | 10 | 10 | 10 |
| Butyl stearate (parts) | 4 | 4 | 4 | 4 | 4 | 4 | 4 | 4 | 4 |
| Glycerol trioleate (parts) | 4 | 4 | 4 | 4 | 4 | 4 | 4 | 4 | 4 |
| Polyisocyanate (Coronate L, produced by Nippon Polyurethane Industry, solid content 75%) (parts) | 12 | 12 | 12 | 12 | 12 | 12 | 12 | 12 | 12 |
| Cyclohexanone (parts) | 240 | 240 | 240 | 240 | 240 | 240 | 240 | 240 | 240 |
| Methyl ethyl ketone (parts) | 80 | 80 | 80 | 80 | 80 | 80 | 80 | 80 | 80 |
| Toluene (parts) | 80 | 80 | 80 | 80 | 80 | 80 | 80 | 80 | 80 |
| Liner sheet (ratio by weight) | Velatec 149-188, polyester/rayon = 50/50 | Mitsubishi Rayon VA-250, acryl = 100 | Velatec 149-007, polyester = 100 | Mitsubishi Rayon VK-450D, acryl/rayon = 50/50 | Velatec 149-188, polyester/rayon = 50/50 | Velatec 149-007, polyester = 100 | Velatec, polyester/rayon = 30/70 | Mitsubishi Rayon, acryl/rayon = 30/70 | Velatec 149-007 + VA-250/rayon = 50/50 |
| Durability (hr) | More than | More than | More than | More than | More than | More than | More than | More than | More than |

TABLE 2-continued

| | | | | | | | | | |
|---|---|---|---|---|---|---|---|---|---|
| Vibration test (affected discs/ tested discs) | 1000 hr 0 | 1000 hr 0 | 1000 hr 0 | 1000 hr 0 | 1000 hr 0 | 1000 hr 0 | 1000 hr 0 | 1000 hr 0 | 1000 hr 0 |
| RF output (%) | 108 | 107 | 110 | 112 | 113 | 135 | 114 | 114 | 113 |

| | Sample No. | E-1-10 | C-1-1 | C-1-2 | C-1-3 | C-1-4 | C-1-5 | C-1-6 |
|---|---|---|---|---|---|---|---|---|
| | Co-γ-Fe$_2$O$_3$ (parts) | 100 | 100 | 100 | — | 100 | 100 | 100 |
| | Fe-based metal powder (parts) | — | — | — | 100 | — | — | — |
| | Vinyl chloride resin (parts) | (4) 20 | (1) 20 | (1) 20 | (1) 12 | (5) 20 | (1) 20 | (5) 20 |
| | Polyurethane (parts) | (A) 8 | (A) 8 | (C) 8 | (C) 8 | (A) 8 | (A) 8 | (C) 8 |
| | Carbon black (parts) | 12 | 12 | 12 | 12 | 12 | 12 | 12 |
| | Alumina (parts) | 10 | 10 | 10 | 10 | 10 | 10 | 10 |
| | Butyl stearate (parts) | 4 | 4 | 4 | 4 | 4 | 4 | 4 |
| | Glycerol trioleate (parts) | 4 | 4 | 4 | 4 | 4 | 4 | 4 |
| | Polyisocyanate (Coronate L, produced by Nippon Polyurethane Industry, solid content 75%) (parts) | 12 | 12 | 12 | 12 | 12 | 12 | 12 |
| | Cyclohexanone (parts) | 240 | 240 | 240 | 240 | 240 | 240 | 240 |
| | Methyl ethyl ketone (parts) | 80 | 80 | 80 | 80 | 80 | 80 | 80 |
| | Toluene (parts) | 80 | 80 | 80 | 80 | 80 | 80 | 80 |
| | Liner sheet (ratio by weight) | Velatec 149-188, polyester/rayon = 50/50 | Velatec 149-303, rayon/polypropylene = 70/30 | Velatec 149-188, polyester/rayon = 50/50 | Velatec 149-188, the same as left | Velatec 149-188, the same as left | Velatec polyester/rayon = 20/80 | Velatec 149-188, polyester/rayon = 50/50 |
| | Durability (hr) | More than 1000 hr | More than 1000 hr | 510 | 200 | 310 | More than 1000 hr | 120 |
| | Vibration test (affected discs/ tested discs) | 0 | 15 | 5 | 4 | 5 | 10 | 15 |
| | RF output (%) | 110 | 108 | 102 | 101 | 96 | 110 | 100 |

Example 2

The samples shown in Table 3 were prepared in the same procedure as in Example 1 except that the binders were changed.

The binders in Table 4 were as shown in the following Table 3. Modified vinylchloride resins 1–4, vinylchloride resin 5 and polyurethane resin C in Table 3 were the same as those used in Example 1.

TABLE 3

| | |
|---|---|
| OH-containing polyurethane resin D: | N-3141 (OH-containing repeat unit 0.5 mol %), produced by Nippon Polyurethane Industry Co., Ltd. |
| OH-containing polyurethane resin E: | EHD-2 (OH-containing |

The samples were evaluated in the same manner as in Example 1.

Reproduction output was measured after recording and reproduction at 250 KHz with the sample placed in a 3.5-inch high density floppy disc drive, expressed as percent ratio to the output obtained in Comparative Example 2-6.

The results are shown in Table 4.

TABLE 3-continued repeat unit 2 mol %), produced by Dainippon Ink and Chemicals, Inc.

TABLE 4

| Sample No. | E-2-1 | E-2-2 | E-2-3 | E-2-4 | E-2-5 | E-2-6 | E-2-7 |
|---|---|---|---|---|---|---|---|
| Co-$\gamma$-Fe$_2$O$_3$ (parts) | 100 | 100 | 100 | 100 | 100 | — | 100 |
| Fe-based metal powder (parts) | — | — | — | — | — | 100 | — |
| Vinyl chloride resin (parts) | (2) 20 | (3) 20 | (1) 20 | (1) 20 | (1) 20 | (1) 12 | (1) 20 |
| Polyurethane (parts) | (D) 8 | (E) 8 | (E) 8 | (D) 8 | (D) 8 | (E) 8 | (D) 8 |
| Carbon black (parts) | 12 | 12 | 12 | 12 | 12 | 12 | 12 |
| Alumina (parts) | 10 | 10 | 10 | 10 | 10 | 10 | 10 |
| Butyl stearate (parts) | 4 | 4 | 4 | 4 | 4 | 4 | 4 |
| Glycerol trioleate (parts) | 4 | 4 | 4 | 4 | 4 | 4 | 4 |
| Polyisocyanate (Coronate L, produced by Nippon Polyurethane Industry, solid content 75%) (parts) | 12 | 12 | 12 | 12 | 12 | 12 | 12 |
| Cyclohexanone (parts) | 240 | 240 | 240 | 240 | 240 | 240 | 240 |
| Methyl ethyl ketone (parts) | 80 | 80 | 80 | 80 | 80 | 80 | 80 |
| Toluene (parts) | 80 | 80 | 80 | 80 | 80 | 80 | 80 |
| Liner sheet (ratio by weight) | Velatec 149-188, polyester/rayon = 50/50 | Mitsubishi Rayon VA-250, acryl = 100 | Velatec 149-007, polyester = 100 | Mitsubishi Rayon VK-450D, acryl/rayon = 50/50 | Velatec 149-188, polyester/rayon = 50/50 | Velatec 149-007, polyester = 100 | Velatec, polyester/rayon = 30/70 |
| Durability (hr) | More than 1000 hr | More than 1000 hr | More than 1000 hr | More than 1000 hr | More than 1000 hr | More than 1000 hr | More than 1000 hr |
| Vibration test (affected discs/tested discs) | 0 | 0 | 0 | 0 | 0 | 0 | 0 |
| RF output (%) | 108 | 108 | 109 | 110 | 107 | 106 | 109 |

| Sample No. | E-2-8 | E-2-9 | E-2-10 | E-2-11 | E-2-12 | C-2-1 | C-2-2 |
|---|---|---|---|---|---|---|---|
| Co-$\gamma$-Fe$_2$O$_3$ (parts) | 100 | 100 | 100 | 100 | 100 | 100 | — |
| Fe-based metal powder (parts) | — | — | — | — | — | — | 100 |
| Vinyl chloride resin (parts) | (1) 20 | (1) 20 | (4) 20 | (2) 20 | (2) 20 | (1) 20 | (1) 12 |
| Polyurethane (parts) | (D) 8 | (D) 8 | (D) 8 | 8*$^1$ | 8*$^2$ | (D) 8 | (C) 8 |
| Carbon black (parts) | 12 | 12 | 12 | 12 | 12 | 12 | 12 |
| Alumina (parts) | 10 | 10 | 10 | 10 | 10 | 10 | 10 |
| Butyl stearate (parts) | 4 | 4 | 4 | 4 | 4 | 4 | 4 |
| Glycerol trioleate (parts) | 4 | 4 | 4 | 4 | 4 | 4 | 4 |
| Polyisocyanate (Coronate L, produced by Nippon Polyurethane Industry, solid content 75%) (parts) | 12 | 12 | 12 | 12 | 12 | 12 | 12 |
| Cyclohexanone (parts) | 240 | 240 | 240 | 240 | 240 | 240 | 240 |
| Methyl ethyl ketone (parts) | 80 | 80 | 80 | 80 | 80 | 80 | 80 |
| Toluene (parts) | 80 | 80 | 80 | 80 | 80 | 80 | 80 |
| Liner sheet | VK-450 | Velatec | Velatec | Velatec | Velatec | Velatec | Velatec |

TABLE 4-continued

| (ratio by weight) | Rayon acryl/ rayon = 30/70 | 149-007 + VA-250/ rayon = 50/50 | 149-188, polyester/ rayon = 50/50 | 149-188, polyester/ rayon = 50/50 | 149-188, polyester/ rayon = 50/50 | 149-303, rayon/ polypropylene = 70/30 | 149-188, polyester/ rayon = 50/50 |
|---|---|---|---|---|---|---|---|
| Durability (hr) | More than 1000 hr | More than 1000 hr | More than 1000 hr | More than 1000 hr | More than 1000 hr | More than 1000 hr | 510 |
| Vibration test (affected discs/ tested discs) | 0 | 0 | 0 | 0 | 0 | 15 | 5 |
| RF output (%) | 110 | 108 | 109 | 106 | 108 | 105 | 101 |

| Sample No. | C-2-3 | C-2-4 | C-2-5 | C-2-6 | C-2-7 | C-2-8 |
|---|---|---|---|---|---|---|
| $Co-\gamma-Fe_2O_3$ (parts) | 100 | 100 | 100 | 100 | 100 | 100 |
| Fe-based metal powder (parts) | — | — | — | — | — | — |
| Vinyl chloride resin (parts) | (1) 20 | (5) 20 | (1) 20 | (5) 20 | (2) 20 | (2) 20 |
| Polyurethane (parts) | (C) 8 | (D) 8 | (D) 8 | (C) 8 | 8*[3] | 8*[4] |
| Carbon black (parts) | 12 | 12 | 12 | 12 | 12 | 12 |
| Alumina (parts) | 10 | 10 | 10 | 10 | 10 | 10 |
| Butyl stearate (parts) | 4 | 4 | 4 | 4 | 4 | 4 |
| Glycerol trioleate (parts) | 4 | 4 | 4 | 4 | 4 | 4 |
| Polyisocyanate (Coronate L, produced by Nippon Polyurethane Industry, solid content 75%) (parts) | 12 | 12 | 12 | 12 | 12 | 12 |
| Cyclohexanone (parts) | 240 | 240 | 240 | 240 | 240 | 240 |
| Methyl ethyl ketone (parts) | 80 | 80 | 80 | 80 | 80 | 80 |
| Toluene (parts) | 80 | 80 | 80 | 80 | 80 | 80 |
| Liner sheet (ratio by weight) | Velatec 149-188, polyester/ rayon = 50/50 | Velatec, 149-188, polyester/ rayon = 50/50 | Velatec, polyester/ rayon = 20/80 | Velatec 149-188, polyester/ rayon = 50/50 | Velatec 149-188, polyester/ rayon = 50/50 | Velatec 149-188, polyester/ rayon = 50/50 |
| Durability (hr) | 200 | 310 | 680 | 250 | 110 | 180 |
| Vibration test (affected discs/ tested discs) | 4 | 5 | 12 | 10 | 9 | 8 |
| RF output (%) | 100 | 94 | 100 | 100 | 98 | 92 |

*[1]OH-containing repeat unit in polyurethane 0.01 mol %
*[2]OH-containing repeat unit in polyurethane 5 mol %
*[3]OH-containing repeat unit in polyurethane 0.005 mol %
*[4]OH-containing repeat unit in polyurethane 6 mol %

EXAMPLE 3

The samples shown in Table 6 were prepared in the same procedure as in Example 1 except that the binders were changed.

The binders listed in Table 6 were as shown in the following Table 5. The other binders listed in Table 5 were the same as those use in Examples 1 and 2.

TABLE 5

| Polar group + OH-containing polyurethane resin F: | Modified with $SO_3Na$, KN-21 ($SO_3Na$ group component 0.5 mol %, OH group component 2 mol %), produced by Toyobo Co., Ltd. |
|---|---|
| Polar group + OH-containing polyurethane resin G: | Modified with COOK, TIM6001 (COOK component 1.0 mol %, OH group component 4 mol %), Sanyo Chemical Industries Ltd. |

The durability and reliability of each obtained floppy disc was evaluated in the same manner as in Example 1.

Reproduction output was measured after recording and reproduction at 250 KHz with the sample placed in a 3.5-inch high density floppy disc drive, expressed as percent ratio to the output obtained in Comparative Example 3-6.

The results are shown in Table 6.

TABLE 6

| Sample No. | E-3-1 | E-3-2 | E-3-3 | E-3-4 | E-3-5 | E-3-6 | E-3-7 | E-3-8 | E-3-9 |
|---|---|---|---|---|---|---|---|---|---|
| $Co-\gamma-Fe_2O_3$ (parts) | 100 | 100 | 100 | 100 | 100 | 100 | 100 | 100 | 100 |
| Vinyl | (2) 20 | (3) 20 | (1) 20 | (1) 20 | (1) 20 | (1) 16 | (1) 20 | (1) 20 | (1) 20 |

TABLE 6-continued

| | | | | | | | | | |
|---|---|---|---|---|---|---|---|---|---|
| chloride resin (parts) | | | | | | | | | |
| Polyurethane (parts) | (F) 8 | (G) 8 | (G) 8 | (G) 8 | (F) 8 | (G) 8 | (F) 8 | (F) 8 | (F) 8 |
| Carbon black (parts) | 12 | 12 | 12 | 12 | 12 | 12 | 12 | 12 | 12 |
| Alumina (parts) | 10 | 10 | 10 | 10 | 10 | 10 | 10 | 10 | 10 |
| Butyl stearate (parts) | 4 | 4 | 4 | 4 | 4 | 4 | 4 | 4 | 4 |
| Glycerol trioleate (parts) | 4 | 4 | 4 | 4 | 4 | 4 | 4 | 4 | 4 |
| Polyisocyanate (Coronate L, produced by Nippon Polyurethane Industry, solid content 75%) (parts) | 12 | 12 | 12 | 12 | 12 | 12 | 12 | 12 | 12 |
| Cyclohexanone (parts) | 240 | 240 | 240 | 240 | 240 | 240 | 240 | 240 | 240 |
| Methyl ethyl ketone (parts) | 80 | 80 | 80 | 80 | 80 | 80 | 80 | 80 | 80 |
| Toluene (parts) | 80 | 80 | 80 | 80 | 80 | 80 | 80 | 80 | 80 |
| Liner sheet (ratio by weight) | Velatec 149-188, polyester/rayon = 50/50 | Mitsubishi Rayon VA-250, acryl = 100 | Velatec 149-007, polyester = 100 | Mitsubishi Rayon VK-450D, acryl/rayon = 50/50 | Velatec 149-188, polyester/rayon = 50/50 | Velatec 149-007, polyester = 100 | Velatec polyester/rayon = 30/70 | Mitsubishi Rayon, acryl/rayon = 30/70 | Velatec 149-007 + VA-250/rayon = 50/50 |
| Durability (hr) | More than 1000 hr | More than 1000 hr | More than 1000 hr | More than 1000 hr | More than 1000 hr | More than 1000 hr | More than 1000 hr | More than 1000 hr | More than 1000 hr |
| Vibration test (affected discs/tested discs) | 0 | 0 | 0 | 0 | 0 | 0 | 0 | 0 | 0 |
| RF output (%) | 112 | 110 | 109 | 115 | 115 | 121 | 114 | 113 | 113 |

| | Sample No. | E-3-10 | C-3-1 | C-3-2 | C-3-3 | C-3-4 | C-3-5 | C-3-6 |
|---|---|---|---|---|---|---|---|---|
| | Co-γ-Fe$_2$O$_3$ (parts) | 100 | 100 | 100 | 100 | 100 | 100 | 100 |
| | Vinyl chloride resin (parts) | (4) 20 | (1) 20 | (5) 20 | (1) 16 | (2) 20 | (1) 20 | (5) 20 |
| | Polyurethane (parts) | (F) 8 | (F) 8 | (G) 8 | (C) 8 | (D) 8 | (F) 8 | (C) 8 |
| | Carbon black (parts) | 12 | 12 | 12 | 12 | 12 | 12 | 12 |
| | Alumina (parts) | 10 | 10 | 10 | 10 | 10 | 10 | 10 |
| | Butyl stearate (parts) | 4 | 4 | 4 | 4 | 4 | 4 | 4 |
| | Glycerol trioleate (parts) | 4 | 4 | 4 | 4 | 4 | 4 | 4 |
| | Polyisocyanate (Coronate L, produced by Nippon Polyurethane Industry, solid content 75%) | 12 | 12 | 12 | 12 | 12 | 12 | 12 |

TABLE 6-continued

|  |  |  |  |  |  |  |  |
|---|---|---|---|---|---|---|---|
| Cyclohexanone (parts) | 240 | 240 | 240 | 240 | 240 | 240 | 240 |
| Methyl ethyl ketone (parts) | 80 | 80 | 80 | 80 | 80 | 80 | 80 |
| Toluene (parts) | 80 | 80 | 80 | 80 | 80 | 80 | 80 |
| Liner sheet (ratio by weight) | Velatec 149-188, polyester/rayon = 50/50 | Velatec 149-303, rayon/polypropylene = 70/30 | Mitsubishi Rayon VK-450D, acryl/rayon = 50/50 | Velatec 149-188, polyester/rayon = 50/50 | Velatec 149-188, polyester/rayon = 50/50 | Velatec, polyester/rayon = 20/80 | Velatec 149-188, polyester/rayon = 50/50 |
| Durability (hr) | More than 1000 hr | 600 | 380 | 355 | 800 | 700 | 120 |
| Vibration test (affected discs/tested discs) | 0 | 15 | 10 | 12 | 6 | 15 | 10 |
| RF output (%) | 108 | 110 | 99 | 94 | 96 | 110 | 100 |

Example 4

The samples shown in Table 8 were prepared in the same procedure as in Example 1 except that the binders were changed.

The durability and reliability of each obtained floppy disc was evaluated in the same manner as in Example 1.

Reproduction output was measured by recording and reproduction at 250 KHz with the sample placed in a 3.5-inch high density floppy disc drive, expressed as percent ratio to the output obtained in Comparative Example 4-2.

The results are shown in Table 8.

The binders listed in Table 8 were as shown in the following Table 7. The other biners listed in Table 7 were the same as those used in after-mentioned examples.

TABLE 7

| Name of binder | |
|---|---|
| Betaine-containing polyurethane H: | (see Synthetic Example) |
| Betaine-containing polyurethane J: | (see Synthetic Example) |
| Betaine-containing polyurethane K: | (see Synthetic Example) |

TABLE 8

| Sample No. | E-4-1 | E-4-2 | E-4-3 | E-4-4 | E-4-5 | E-4-6 | E-4-7 | E-4-8 |
|---|---|---|---|---|---|---|---|---|
| [Magnetic paint composition] | | | | | | | | |
| Co-γ-Fe$_2$O$_3$ (parts) | 100 | 100 | 100 | — | — | 100 | 100 | 100 |
| Fe-Al metal powder (BET 47 m$^2$/g) (parts) | — | — | — | 100 | 100 | — | — | — |
| Vinyl chloride resin (parts) | (5) 20 | (5) 18 | (1) 18 | (1) 16 | (1) 16 | (1) 18 | (1) 18 | (1) 18 |
| Polyurethane (parts) | (H) 8 | (J) 12 | (K) 12 | (H) 10 | (J) 10 | (K) 12 | (K) 12 | (K) 12 |
| Carbon black (parts) | 12 | 12 | 12 | 12 | 12 | 12 | 12 | 12 |
| Alumina (parts) | 10 | 10 | 10 | 10 | 10 | 10 | 10 | 10 |
| Butyl stearate (parts) | 4 | 4 | 4 | 4 | 4 | 4 | 4 | 4 |
| Butoxyethyl palmitate (parts) | 4 | 4 | 4 | 4 | 4 | 4 | 4 | 4 |
| Polyisocyanate (Coronate L, produced by Nippon Polyurethane Industry, solid content 75%) (parts) | 12 | 12 | 12 | 12 | 12 | 12 | 12 | 12 |
| Cyclohexanone (parts) | 240 | 240 | 240 | 240 | 240 | 240 | 240 | 240 |
| Methyl ethyl ketone (parts) | 80 | 80 | 80 | 80 | 80 | 80 | 80 | 80 |
| Toluene (parts) | 80 | 80 | 80 | 80 | 80 | 80 | 80 | 80 |
| Liner sheet | Velatec 149-188, | Mitsubishi Rayon | Velatec 149-007, | Mitsubishi Rayon | Velatec 149-188, | Velatec 149-007, | Mitsubishi Rayon, | Velatec 149-007 + |

TABLE 8-continued

| | polyester/rayon = 50/50 | VA-250, acryl = 100 | polyester = 100 | polyester/acryl/rayon = 50/50 | VK-450D, rayon = 50/50 | polyester/rayon = 30/70 | VK-450D, acryl/rayon = 30/70 | VA-250/rayon = 50/50 |
|---|---|---|---|---|---|---|---|---|
| Durability (hr) | More than 1000 hr | More than 1000 hr | More than 1000 hr | More than 1000 hr | More than 1000 hr | More than 1000 hr | More than 1000 hr | More than 1000 hr |
| Vibration test (affected discs/tested discs) | 0 | 0 | 0 | 0 | 0 | 0 | 0 | 0 |
| RF output (%) | 105 | 100 | 100 | 125 | 125 | 102 | 101 | 100 |

| Sample No. | C-4-1 | C-4-2 | C-4-3 | C-4-4 | C-4-5 | C-4-6 |
|---|---|---|---|---|---|---|
| [Magnetic paint composition] | | | | | | |
| Co-γ-Fe$_2$O$_3$ (parts) | 100 | 100 | — | 100 | 100 | 100 |
| Fe-Al metal powder (BET 47 m$^2$/g) (parts) | — | — | 100 | — | — | — |
| Vinyl chloride resin (parts) | (5) 20 | (1) 18 | (1) 16 | (1) 18 | (1) 18 | (1) 18 |
| Polyurethane (parts) | (H) 8. | (C) 12 | (C) 10 | (K) 12 | (K) 12 | (C) 12 |
| Carbon black (parts) | 12 | 12 | 12 | 12 | 12 | 12 |
| Alumina (parts) | 10 | 10 | 10 | 10 | 10 | 10 |
| Butyl stearate (parts) | 4 | 4 | 4 | 4 | 4 | 4 |
| Butoxyethyl palmitate (parts) | 4 | 4 | 4 | 4 | 4 | 4 |
| Polyisocyanate (Coronate L, produced by Nippon Polyurethane Industry, solid content 75%) (parts) | 12 | 12 | 12 | 12 | 12 | 12 |
| Cyclohexanone (parts) | 240 | 240 | 240 | 240 | 240 | 240 |
| Methyl ethyl ketone (parts) | 80 | 80 | 80 | 80 | 80 | 80 |
| Toluene (parts) | 80 | 80 | 80 | 80 | 80 | 80 |
| Liner sheet | Velatec 149-303, rayon/polypropylene = 75/25 | Mitsubishi Rayon VK-450D, acryl/rayon = 50/50 | Velatec 149-188, polyester/rayon = 50/50 | Velatec, polyester/rayon = 20/80 | Mitsubishi Rayon VK-450D, acryl/rayon = 20/80 | Velatec 149-303, rayon/polypropylene = 75/25 |
| Durability (hr) | 600 | 380 | 400 | 610 | 390 | 580 |
| Vibration test (affected discs/tested discs) | 15 | 10 | 9 | 18 | 21 | 25 |
| RF output (%) | 103 | 100 | 121 | 100 | 101 | 97 |

From these results, it is evident that it is possible to provide a high output disc which offers excellent reliability and high durability for a long time by preparing a floppy disc in accordance with the present invention.

What is claimed is:

1. A magnetic disc assembly comprising a disc-shaped magnetic recording medium having a magnetic layer comprising a ferromagnetic powder and a binder, said binder comprising a modified polyurethane resin containing a polar group selected from the group consisting of —SO$_3$M, —O-SO$_3$M, —COOM, —PO(OM)$_2$, —OPO(OM)$_2$, and hydroxyl, in which M is hydrogen or an alkali metal, provided that said —SO$_3$M, OSO$_3$M, —COOM, —PO(OM)$_2$, and —OPO(OM$_2$) can form an intramolecular salt thereof, said ferromagnetic powder comprising an Fe-Al metal alloy in an iron to aluminum ratio of 100:1 to 100:20, based on the number of atoms; Fe-Ni metal alloy comprising not less than 80 percent of iron and 2 to 20 percent of nickel based on atomic weight; or hexagonal ferrite, and surrounding said medium, a case having a liner of non-woven fabric comprising a polyester fiber and/or a polyacrylonitrile fiber in a ratio of not less than 30 percent of total fiber weight contained in said liner.

2. A magnetic disc of claim 1, wherein said binder comprises a modified polyurethane resin containing said polar group and a modified polyvinyl chloride resin containing a polar group selected from the group consisting of a —SO$_3$M group, a —OSO$_3$M group, a —COOM group, a —PO(OM)$_2$ group and a —OPO(OM)$_2$ group, in which M is a hydrogen atom or a alkali metal atom.

3. A magnetic disc of claim 2, wherein said modified polyurethane resin containing said polar group comprises a repeating unit having said polar group in an amount of from 0.01 mol % to 5 mol % based on said resin.

4. A magnetic disc of claim 3, wherein said modified polyurethane resin containing said polar group comprises a repeating unit having said polar group in an amount of from 0.1 mol % to 2.0 mol % based on said resin.

5. A magnetic disc of claim 2, wherein said modified polyurethane resin containing said polar group has a weight-average molecular weight of from 10,000 to 150,000.

6. A magnetic disc of claim 5, wherein said modified polyurethane resin containing said polar group has a weight-average molecular weight of from 20,000 to 60,000.

7. A magnetic disc of claim 2, wherein said modified polyvinyl chloride resin contains said polar group in an amount of from 0.05% to 4.0% by weight.

8. A magnetic disc of claim 2, wherein said modified polyvinyl chloride resin has an average polymerization degree of from 100 to 900.

9. A magnetic disc of claim 8, wherein said modified polyvinyl chloride resin has an average polymerization degree of from 200 to 500.

10. A magnetic disc of claim 2, wherein said modified polyvinyl chloride resin comprises vinyl chloride in an amount of not less than 60% by weight.

11. A magnetic disc of claim 2, wherein a ratio of said modified polyurethane resin containing said polar group and said modified polyvinyl chloride resin is 80:20 to 20:80 by weight.

12. A magnetic disc of claim 11, wherein a ratio of said modified polyurethane resin containing said polar group and said modified polyvinyl chloride resin is 70:30 to 40:60 by weight.

13. A magnetic disc of claim 1, wherein said binder comprises a modified polyurethane resin containing a hydroxy group and a modified polyvinyl chloride resin containing a polar group selected from the group consisting of a $-SO_3M$ group, a $-OSO_3M$ group, a $-COOM$ group, a $-PO(OM)_2$ group and a $-OPO(OM)_2$ group, in which M is a hydrogen atom or a alkali metal atom.

14. A magnetic disc of claim 13, wherein said modified polyurethane resin containing a hydroxy group comprises a repeating unit having a hydroxyl group in an amount of from 0.01 mol % to 5 mol % based on said resin.

15. A magnetic disc of claim 14, wherein said modified polyurethane resin containing a hydroxyl group comprises a repeating unit having a hydroxy group in an amount of from 0.1 mol % to 3.0 mol % based on said resin.

16. A magnetic disc of claim 13, wherein said modified polyurethane resin containing a hydroxyl group has a weight-average molecular weight of from 10,000 to 150,000.

17. A magnetic disc of claim 16, wherein said modified polyurethane resin containing a hydroxyl group has a weight-average molecular weight of from 20,000 to 70,000.

18. A magnetic disc of claim 13, wherein said modified polyvinyl chloride resin contains said polar group in an amount of from 0.05% to 4.0% by weight based on said resin.

19. A magnetic disc of claim 13, wherein said modified polyvinyl chloride resin has an average polymerization degree of from 100 to 900.

20. A magnetic disc of claim 19, wherein said modified polyvinyl chloride resin has an average polymerization degree of from 200 to 500.

21. A magnetic disc of claim 13, wherein said modified polyvinyl chloride resin comprises polyvinyl chloride in an amount of not less than 60% by weight based on said resin.

22. A magnetic disc of claim 13, wherein a ratio of said modified polyurethane resin containing a hydroxyl group and said modified polyvinyl chloride resin is 80:20 to 20:80 by weight based on said resin.

23. A magnetic disc of claim 22, wherein a ratio of said modified polyurethane resin containing a hydroxy group and said modified polyvinyl chloride resin is 70:30 to 40:60 by weight based on said resin 24. The magnetic disc assembly of claim 50 wherein said binder comprises a modified polyurethane resin containing a polar group selected from the group consisting of $-SO_3M$, $-OSO_3M$, $-COOM$, $-PO(OM)_2$, $-OPO(OM)_2$, and a second substituent comprising a hydroxyl group, said binder further comprising a modified polyvinyl chloride resin containing a polar group selected from the group consisting of $-SO_3M$, $-OSO_3M$, $-COOM$, $-PO(OM)_2$, and $-OPO(OM)_2$, and $-OPO(OM)_2$, in which M is hydrogen or an alkali metal.

25. A magnetic disc of claim 24, wherein aid modified polyurethane resin containing said polar group and said second substituent comprises a repeating unit having said polar group in an amount of from 0.01 mol % to 5 mol % based on said resin.

26. A magnetic disc of claim 25, wherein said modified polyurethane resin containing said polar group and said second substituent comprises a repeating unit having said polar group in an amount of from 0.1 mol % to 2 mol %.

27. A magnetic disc of claim 24, wherein said modified polyurethane resin containing said polar group and said second substituent comprises a repeating unit having said hydroxyl group in an amount of from 0.1 mol % to 20 mol % based on said resin.

28. A magnetic disc of claim 27, wherein said modified polyurethane resin containing said polar group and said second substituent comprises a repeating unit having said hydroxyl group in an amount of from 1.0 mol % to 5.0 mol % based on said resin.

29. A magnetic disc of claim 24, wherein said modified polyurethane resin containing said polar group and said second substituent has a weight-average molecular weight of from 5,000 to 150,000.

30. A magnetic disc of claim 29, wherein said modified polyurethane resin containing said polar group and said second substituent has a weight-average molecular weight of from 10,000 to 60,000.

31. A magnetic disc of claim 24, wherein said modified polyvinyl chloride resin contains said polar group in an amount of from 0.05% to 4.0% by weight based on said resin.

32. A magnetic disc of claim 24, wherein said modified polyvinyl chloride resin has an average polymerization degree of from 100 to 900.

33. A magnetic disc of claim 24, wherein said modified polyviny chloride resin has an average polymerization degree of from 200 to 500.

34. A magnetic disc of claim 33, wherein said modified polyvinyl chloride resin comprises vinyl chloride in an amount of not less than 60% by weight based on said resin.

35. A magnetic disc of claim 24, wherein a ratio of said modified polyurethane resin having said polar group and said second substituent and said modified polyvinyl chloride resin is 80:20 to 20:80 by weight based on said resin.

36. A magnetic disc of claim 35, wherein a ratio of said modified polyurethane resin containing said polar group and said second substituent and said modified polyvinyl chloride resin is 70:30 to 40:60 by weight based on said resin.

37. A magnetic disc of claim 1, wherein said binder comprises a modified polyurethane resin containing said polar group forms an intramolecule salt.

38. A magnetic disc of claim 37, wherein said intermolecular salt has a form of betain group.

39. A magnetic disc of claim 37, wherein said modified polyurethane contains said betain group in an amount of from 0.01 mmol/g to 1.0 mmol/g.

40. A magnetic disc of claim 39, wherein said modified polyurethane contains said betain group in an amount of from 0.1 mmol/g to 0.5 mmol/g.

41. A magnetic disc of claim 37, wherein said modified polyurethane resin containing said polar group forming an intermolecular salt has a weight-average molecular weight of from 5,000 to 100,000.

42. A magnetic disc of claim 42, wherein said modified polyurethane resin containing said polar group forming an intermolecular salt has a weight-average molecular weight of from 10,000 to 40,000.

43. A magnetic disc of claim 37, wherein said binder further comprises a modified polyvinyl chloride resin containing a polar group selected from the group consisting of a $-SO_3M$ group, a $-OSO_3M$ group, a $-COOM$ group, a $-PO(OM)_2$ group and a $-OPO(OM)_2$ group, in which M is a hydrogen atom or an alkali metal atom.

44. A magnetic disc of claim 43, wherein said modified polyvinyl chloride resin contains said polar group in an amount of from 0.05% to 4.0% by weight based on said resin.

45. A magnetic disc of claim 43, wherein said modified polyvinyl chloride resin has an average polymerization degree of from 100 to 900.

46. A magnetic disc of claim 45, wherein said modified polyvinyl chloride resin has an average polymerization degree of from 200 to 500.

47. A magnetic disc of claim 43, wherein said modified polyvinyl chloride resin comprises vinyl chloride in an amount of not less than 60% by weight based on said resin.

48. A magnetic disc of claim 43, wherein a ratio of said modified polyurethane resin containing said polar group forming an intramolecular salt and said modified polyvinyl chloride resin is 80:20 to 20:80 by weight.

49. A magnetic disc of claim 48, wherein a ratio of said modified polyurethane resin containing said polar group forming an intramolecular salt and said modified polyvinyl chloride resin is 70:30 to 40:60 by weight.

* * * * *